United States Patent
Wu

(10) Patent No.: US 6,966,211 B2
(45) Date of Patent: Nov. 22, 2005

(54) DOWNHOLE CALIBRATION SYSTEM FOR DIRECTIONAL SENSORS

(75) Inventor: Jian-Qun Wu, Houston, TX (US)

(73) Assignee: Precision Drilling Technology Services Group Inc., Calgary (CA)

( * ) Notice: Subject to any disclaimer, the term of this patent is extended or adjusted under 35 U.S.C. 154(b) by 339 days.

(21) Appl. No.: 10/359,372

(22) Filed: Feb. 4, 2003

(65) Prior Publication Data

US 2004/0149004 A1 Aug. 5, 2004

(51) Int. Cl.$^7$ .............................................. G01C 17/38
(52) U.S. Cl. ......................................................... 73/1.75
(58) Field of Search ................................ 73/1.01, 1.15, 73/1.75, 1.76, 152.43, 152.46; 324/202; 33/302, 304, 312, 313, 356

(56) References Cited

U.S. PATENT DOCUMENTS

| | | |
|---|---|---|
| 4,682,421 A | 7/1987 | van Dongen et al. |
| 4,709,486 A | 12/1987 | Walters |
| 4,819,336 A | 4/1989 | Russell |
| RE33,708 E | 10/1991 | Roesler |
| 5,103,177 A | 4/1992 | Russell et al. |
| 5,564,193 A | 10/1996 | Brooks |
| 5,623,407 A | 4/1997 | Brooks |

FOREIGN PATENT DOCUMENTS

| | | |
|---|---|---|
| EP | 0654686 AE | 11/1996 |
| GB | 2347224 A | 8/2000 |

OTHER PUBLICATIONS

R. Estes and P. Walters. Improvement of Azimuth Accuracy by Use of Iterative Total Field Calibration Technique and Compensation for System Environment Effects: SPE Article 19546. 64th Annual Technical Conference, Oct. 1989.

UK Patent Office Search Report dated May 17, 2004.

*Primary Examiner*—Robert Raevis
(74) *Attorney, Agent, or Firm*—Patrick McCollum

(57) ABSTRACT

A method and apparatus is disclosed for improving the accuracy of directional surveys using magnetometers and accelerometers. The method corrects errors in bias, scale-factor, misalignment of cross-axial magnetometers, and bias or scale-factor of axial magnetometer by requiring the magnitude of measured cross-axial magnetic field to be as constant as possible over several tool face angles at a survey point in a wellbore and the magnitude of the measured total magnetic field and dip angle equal to the reference values, respectively. The axial component of the measured magnetic field is also determined. The method also corrects accelerometers similarly. The calibration parameters obtained at one survey point are applied to measurements at other survey points to improve the accuracy of surveys and the efficiency of drilling operations.

29 Claims, 2 Drawing Sheets

DOWNHOLE CALIBRATION SYSTEM FOR DIRECTIONAL SENSORS

FIELD OF THE INVENTION

This invention relates to the directional drilling of boreholes using Measurement-While-Drilling (MWD) directional sensors and provides a method of and means for calibrating the directional sensors downhole to improve the determination of a well orientation.

MWD directional sensors are used to determine the orientation of wells. A MWD directional sensor uses three magnetometers and three accelerometers. The sensor array is packaged and housed in a tool as a section of the drillstring near the drill bit. The three magnetometers are used to obtain magnetic field components along three orthogonal axes either directly by mounting magnetometers orthogonally or indirectly by transforming the three nearly orthogonal measurements onto the orthogonal axes. The same is true for the accelerometers. The accelerometers measure acceleration which has the same magnitude but opposite sign as the gravity field when the directional tool is at rest. Therefore, accelerometers are used to measure gravitational field components along three orthogonal axes. They are used as gravity meters.

The axes of magnetometers and accelerometers are usually made to be exactly aligned with each other and are used as those of the directional sensor frame, even though it is not necessary to do so. As long as the relative orientation between magnetic and gravitational axes are known, one can always transform magnetic measurements into those along gravity axes or vice versa or both types of measurements into a different frame. Without a loss of generality, it is assumed that the three magnetometers measure magnetic field components along x, y, and z directions where z is along the drillstring axis and x, y, and z are orthogonal. The accelerometers measure the gravitational field components along the same x, y, and z directions.

The directional sensor measures the earth's magnetic vector $\bar{B}=(B_x, B_y, B_z)$ and gravity vector $\bar{G}=(G_x, G_y, G_z)$ at a survey point in a well. These measurements are used to obtain through known methods the orientation of the well at the survey point, namely, the inclination and azimuth. The sensor orientation about drillstring axis, i.e. the tool face angle, can also be obtained.

The correct determination of well azimuth relies on accurate measurement of the earth's magnetic vector. Two factors related to magnetometers may corrupt the determination of azimuth. One is due to a magnetic field generated by magnetizations in magnetic material near the directional sensor package so that the measured magnetic field is not purely that of the earth. The extra field interferes with the earth field and is called magnetic interference or interference. The other is magnetometer sensor error causing a magnetometer reading to be different from the field being measured.

The magnetometers and accelerometers in a sensor package are calibrated when the directional tool is manufactured. The calibration parameters are bias and scale factor for each sensor and misalignments among sensor axes. The parameters are applied to convert sensor output into magnetic and gravitational measurements. For example, magnetometer measurements are related to the magnetic sensor outputs by the following equation:

$$\begin{pmatrix} B_x \\ B_y \\ B_z \end{pmatrix} = \begin{pmatrix} 1 & m_{xy} & m_{xz} \\ m_{yx} & 1 & m_{yz} \\ m_{zx} & m_{zy} & 1 \end{pmatrix} \left\{ \begin{pmatrix} 1/s_x & 0 & 0 \\ 0 & 1/s_y & 0 \\ 0 & 0 & 1/s_z \end{pmatrix} \begin{pmatrix} V_x \\ V_y \\ V_z \end{pmatrix} - \begin{pmatrix} B_{0x} \\ B_{0y} \\ B_{0z} \end{pmatrix} \right\}, \quad (1)$$

where s's are scale-factors, m's are misalignments, V's are sensor outputs such as voltages, and $B_0$'s are biases. The accelerometer measurements are related to accelerometer sensor outputs by an equation identical in form to the above equation.

Many factors cause the calibration parameters to drift with time. Directional sensors are recalibrated from time to time.

To eliminate the magnetic interference, a directional sensor array is housed in the midsection of a nonmagnetic drill collar. If the nonmagnetic collar is long enough, then the interference is negligible. Nonmagnetic collars are used in all drilling operations where magnetometers are used for directional sensing.

Because of mechanical and other operational constraints and considerations, sometimes an operator has to use a shortened nonmagnetic collar for directional sensor.

With a shortened nonmagnetic collar for the directional sensor package, the magnetic interference from adjacent magnetic material on drillstring corrupts the readings of magnetometers. Namely, the magnetometer measurements are no longer those of the earth's magnetic field, but the sum of the earth's field and the interference field due to the magnetizations in the magnetic material.

When interference is present, well-calibrated magnetometers still measure correctly the magnetic field at the survey point. But the interference term is an error in the measurement of the earth's magnetic field. Because of the rigid relative position between the directional sensor and the interfering magnetic material on the drillstring, interference is a constant in the directional sensor frame. Thus a magnetic interference appears as a bias error in the measurement of the earth's magnetic field. To obtain an accurate measurement of azimuth, one must subtract the interference from magnetometer measurement. Methods and techniques for correcting magnetic interference from the use of shortened nonmagnetic collars to house directional sensors are called short-collar methods or short-collar algorithms.

STATEMENT OF THE PRIOR ART

Because a magnetic interference comes from magnetic materials on sections of the drillstring above or below the directional sensor collar, the interference is mainly in the axial direction. The measurement of the earth's magnetic field component along the axial direction is affected most.

Several techniques have been developed to determine and eliminate the axial magnetic interference. In Russell, U.S. Pat. No. 4,819,336, the axial component of the earth's magnetic field is determined by choosing a $B_z$ so that $\bar{B}=(B_x, B_y, B_z)$ satisfies some constraint imposed by the known magnitude and dip angle of the earth's magnetic field. The known parameters $B_{ref}$ and $\theta_{ref}$ are called reference magnitude and reference dip angle. They are obtained from sources independent of the directional sensor measurement. In one method disclosed by Russell, $B_z$ is determined by requiring the measured magnitude, $B=\sqrt{B_x^2+B_y^2+B_z^2}$, to equal to that of reference, $B_{ref}$. By determining axial magnetic field component this way, one obtains a $B_z$ value free of axial magnetic interference. In fact, the measurement of $B_z$ is not necessary if the sign of it is known from the approximate orientation of the well at the survey point.

The shortcoming of all methods using known properties of the earth's magnetic field as constraints to correct only axial interference is that in obtaining the interference-free axial magnetic component, $B_z$, the measurements of the cross-axial component, $\overline{B}_{oxy}=(B_x, B_y)$, are assumed to be exact. Therefore, measurement errors in the cross-axial components cause errors in $B_z$ obtained from a short-collar algorithm, which in turn cause errors in azimuth. This effect is especially pronounced when the directional tool is near the East-West and horizontal direction. Near this orientation, error in $B_z$ from a short-collar algorithm due to a small and otherwise acceptable $\overline{B}_{oxy}$ error can be much larger than the axial interference. Therefore, axial interference correction is often not applied in this region. The amplification of azimuth error from $\overline{B}_{oxy}$ error in this region by a short-collar method is due to geometry, not the details of the method. The only effective way to reduce the amplification effect is to reduce the $\overline{B}_{oxy}$ measurement error.

The above-mentioned shortcoming is partially overcome by interference-correction methods where magnetic bias errors in all three directions are corrected. In van Dongen et al., U.S. Pat. No. 4,682,421, a method is disclosed for eliminating magnetic interference from magnetometer measurements. The interference in the x and y directions which are perpendicular to the drillstring axis is eliminated by making $B_x$ and $B_y$ measurements at several tool face angles at a survey point. If the magnetometers are accurate and the interference is absent, then the magnitude of the cross-axial magnetic field, $$B_{oxy} = \sqrt{B_x^2 + B_y^2},$$

should be constant for all tool face angles. The interference in the x and y directions is determined by adjusting the x and y biases so that the corrected $B_{oxy}$ is as constant as possible over tool face. The adjustment is the interference term. By subtracting the interference from $B_x$ and $B_y$, the measurements are those of the earth's field, free of magnetic interference. The magnetic field component in the axial direction $B_z$ is then determined by requiring the smallest vector difference between measured magnetic field vector and that of the earth obtained from another source to be minimal, namely by choosing a $B_z$ that minimizes the E in the following equation, $$E = \sqrt{B^2 + B_{ref}^2 - 2BB_{ref}\cos(\theta - \theta_{ref})},$$

where $B_{ref}$ and $\theta_{ref}$ are the reference magnitude and dip angle of the earth's magnetic field, and $$B = \sqrt{B_x^2 + B_y^2 + B_z^2},$$

$\theta$ are the measured magnitude and dip angle where $B_x$ and $B_y$ are bias corrected measurements of cross-axial magnetic field components. In this method, the measurement of $B_z$ is sometimes not necessary.

In Brooks, U.S. Pat. No. 5,623,407, the bias errors due to interference and other sources are determined by choosing the biases that minimize the variance of magnetic field magnitude at several sensor orientations.

All existing methods designed for eliminating magnetic interference by correcting bias errors in magnetometers also eliminate bias errors caused by factors unrelated to interference. In fact, the improvement on axial interference determination and elimination by methods of van Dongen et al. and Brooks come mainly from the elimination of cross-axial bias errors unrelated to interference since the cross-axial interference is rarely significant.

The scale-factor errors and misalignment errors in x and y magnetometers can still produce errors in the measurement of $B_{oxy}$ which in turn produce errors in $B_z$ determined from a short-collar algorithm, thus causing an extra error in azimuth in addition to the error directly created by errors in the measurement of $B_{oxy}$.

SUMMARY OF THE INVENTION

The present invention consists of the steps of:

(1) obtaining reference values of magnitude and dip angle of the earth's magnetic field;

(2) making magnetometer and accelerometer measurements at several tool face angles at a survey point in the wellbore;

(3) determining the bias errors in x and y magnetometers and errors of misalignment and relative scale-factor between x and y magnetometers by choosing the error parameters so that the magnitudes of the corrected cross-axial magnetic field at all tool face angles are as constant as possible;

(4) determining the axial component of magnetic field, $B_z$, and the scale-factor error common to both cross-axial magnetometers by requiring the measured magnitude and dip angle of magnetic field after applying corrections to equal to their reference values, respectively;

(5) applying corrections obtained in steps (1) to (4) to obtain corrected magnetic field measurements, $\overline{B}_c=(B_{xc}, B_{yc}, B_{zc})$ at one or all the tool face angles;

(6) calculating well orientation using $\overline{B}_c=(B_{xc}, B_{yc}, B_{zc})$ and accelerometer measurements.

In step (4), the axial component of the magnetic field is determined. This can be done without an axial magnetic measurement in cases where the approximate inclination and azimuth of the directional tool is known. Therefore, this invention can be used when only the measurements of cross-axial magnetometers are available. When the measurement of axial magnetometer is available, the bias error caused by interferences or other factors is the difference between $B_{zc}$ and the axial magnetometer reading before correction if bias is known to be the dominant problematic calibration parameter. If axial scale-factor is the main source of error in axial magnetometer, then the difference between one and the ratio of $B_{zc}$ over the axial magnetometer reading before correction is the scale-factor error.

The calibration parameters determined using this invention at one survey point can be used at other survey points. This invention can be viewed as a downhole calibration method.

This invention is also a method for calibrating biases, misalignment, scale-factors in x and y directions, and either the axial bias or scale-factor for accelerometers.

DESCRIPTION OF THE PREFERRED EMBODIMENTS

Figure 1:
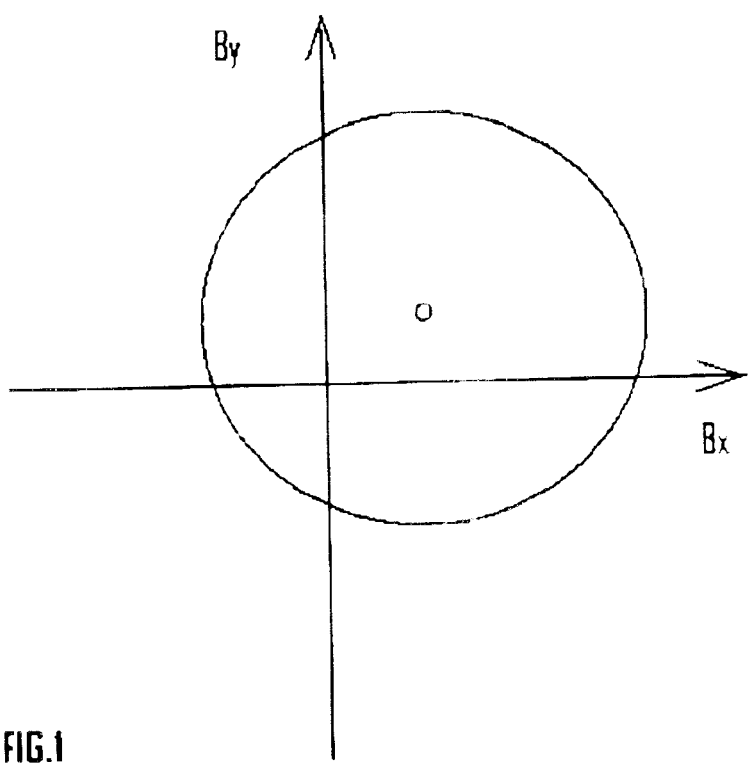
FIG. 1 is a diagram of the magnetic field measured by the cross-axial magnetometers with only bias errors plotted as a function of tool face.

FIG. 1 shows the effect of bias errors in x and y magnetometers on magnetic measurement. For perfect magnetometers, the diagram is a circle centered at the origin. With biases in magnetometers, the diagram is still a circle, but is off-centered. The displacements between the center of the circle and the origin of the $B_x$ and $B_y$ coordinates are the bias errors in x and y magnetometers, respectively. Prior art techniques known to one skilled in the art can been used to determine the bias errors and corrections can been made to x and y magnetometers. After corrections, the diagram is a circle centered at the origin.

Figure 2:
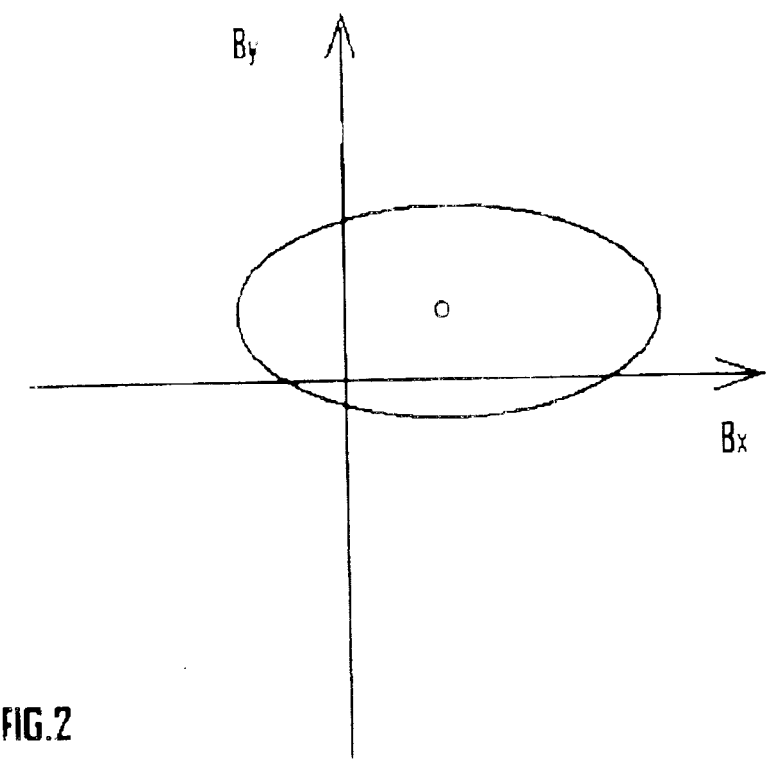
FIG. 2 is a diagram similar to that of FIG. 1 except that the cross-axial magnetometers have both bias and scale-factor errors.

When there are errors in scale-factors in x and y magnetometers, the diagram is in general an ellipse. In FIG. 2, the diagram corresponds to a case where y magnetometer scale-factor is smaller than the correct value. Prior art short-collar algorithms can be used to correct the bias errors so that the corrected diagram is centered at the origin. However, it remains elliptical in shape.

In this invention, the x and y magnetometer scale-factors are also corrected in addition to bias corrections. They are determined by requiring the diagram in FIG. 2 to be deformed into a circle centered at the origin (constant magnitude constraint). The circular requirement only determines the relative scale-factor error between x and y magnetometers. If both magnetometers have identical scale-factor errors, the diagram is still a circle. The cross-axial scale-factor errors are corrected in two steps.

In the first step (step (3) in the Summary of the Invention), errors in biases in x and y magnetometers and a relative scale-factor error between the two magnetometers are determined by the centered circle requirement. The cross-axial scale-factor error common to both cross-axial magnetometers and the correct axial magnetic field component, $B_z$, are determined in the second step (step (4) in the summary of the invention). After two steps, errors of bias and scale-factor in the x and y magnetometers and the correct axial component of the earth's magnetic field are determined.

There are many ways to parameterize the relative scale-factor error in the first step. They all lead to the same final results after the second step. One way is to assume that there is no scale-factor error in the x magnetometer in the first step. The scale-factor error in the y magnetometer is the relative error.

Let $\overline{B}_i = (B_{ix}, B_{iy}, B_{iz})$ and $\overline{G}_i = (G_{ix}, G_{iy}, G_{iz})$ be the measured magnetic and gravitational fields, respectively, at the ith tool face angle among a group of field measurements at N tool faces at a survey point in a well. After the first step, the corrected measurements of the cross-axial magnetic field, $(\tilde{B}_{ix}, \tilde{B}_{iy})$ is related to those of before correction by $$\begin{pmatrix} \tilde{B}_{ix} \\ \tilde{B}_{iy} \end{pmatrix} = \begin{bmatrix} 1 & 0 \\ 0 & 1+s_{xy} \end{bmatrix} \begin{pmatrix} B_{ix} \\ B_{iy} \end{pmatrix} - \begin{pmatrix} \Delta B_x \\ \Delta B_y \end{pmatrix}, \quad i = 1, 2, 3 \ldots, N, \quad (2)$$

where $\Delta B_x$ and $\Delta B_y$ are x and y magnetometer bias errors, respectively, and $s_{xy}$ is the relative scale-factor error. They are determined by the centered circle requirement. This is accomplished mathematically by solving the following equations for $\Delta B_x$, $\Delta B_y$, and $s_{xy}$:

$$\frac{\partial I}{\partial \Delta B_x} = 0, \quad (3)$$

$$\frac{\partial I}{\partial \Delta B_y} = 0, \quad (4)$$

$$\frac{\partial I}{\partial s_{xy}} = 0, \quad (5)$$

$$I = \frac{1}{N} \sum_{i=1}^{N} \left[ \tilde{B}_{ix}^2 + \tilde{B}_{iy}^2 - \frac{1}{N} \sum_{j=1}^{N} (\tilde{B}_{jx}^2 + \tilde{B}_{jy}^2) \right]^2, \quad (6)$$

$$\tilde{B}_{ix}^2 + \tilde{B}_{iy}^2 = B_{ix}^2 + B_{iy}^2 + s_{xy}(2+s_{xy})B_{iy}^2 - \quad (7)$$

$$2\Delta B_x B_{ix} - 2(1+s_{xy})\Delta B_y B_{iy} + \Delta B_x^2 + \Delta B_y^2.$$

Let $(B_{ixc}, B_{iyc}, B_{zc})$ be the magnetic field measurements at the ith tool face angle after the correction made in the second step. Because the axial component of the earth's magnetic field is a constant with respect to tool face rotation, there should be only one value of corrected axial component for all tool face angles. The corrected magnetic field after the second step correction is related to that of the first step by:

$$B_{ixc} = (1+s)\tilde{B}_{ix},$$

$$B_{iyc} = (1+s)\tilde{B}_{iy},$$

$$B_{zc} = \frac{1}{N} \sum_{i=1}^{N} B_{iz} - \Delta B_z = \overline{B}_z - \Delta B_z,$$

where s is the common cross-axial scale-factor error and $\Delta B_z$ is the axial magnetic field correction. In cases where the axial magnetic measurements are not available, $\overline{B}_z$ is estimated to be $$\pm \sqrt{B_{ref}^2 - \frac{1}{N} \sum_{i=1}^{N} (\tilde{B}_{ix}^2 + \tilde{B}_{iy}^2)},$$

where the sign is determined by the knowledge of the approximate well orientation at the survey point.

s and $B_{zc}$ are determined by requiring (1) the magnitude of measured magnetic field corrected after the second step equal to the reference value of the magnitude of the earth's magnetic field (B total constraint) (2) the magnetic dip angle calculated with measurements corrected in the second step equal to the reference dip angle (dip angle constraint). In the preferred embodiment, the two constraints are realized mathematically as the following two equations:

$$\frac{1}{N} \sum_{i=1}^{N} \left[ (1+s)^2 (\tilde{B}_{ix}^2 + \tilde{B}_{iy}^2) + B_{zc}^2 \right] = B_{ref}^2, \quad (8)$$

$$\frac{1}{N} \sum_{i=1}^{N} \frac{(1+s)(G_{ix}\tilde{B}_{ix} + G_{iy}\tilde{B}_{iy}) + G_{iz}B_{zc}}{\sqrt{G_{ix}^2 + G_{iy}^2 + G_{iz}^2} \sqrt{(1+s)^2(\tilde{B}_{ix}^2 + \tilde{B}_{iy}^2) + B_{zc}^2}} = \sin(\theta_{ref}). \quad (9)$$

Equations (3)–(5) are quadratic in $\Delta B_y$, $s_{xy}$ and linear in $\Delta B_x$. They can be solved algebraically or numerically using known algorithms. In the preferred embodiment of the present invention, they are solved iteratively using linear approximations.

Because $s_{xy}$ is very small compared with 1, the term $s_{xy}$ in $(2+s_{xy})$ and $(1+s_{xy})$ in equation (7) can be dropped, resulting in the following equation:

$$\tilde{B}_{ix}^2 + \tilde{B}_{iy}^2 \approx B_{ix}^2 + B_{iy}^2 + 2s_{xy}B_{iy}^2 - 2B_{ix}\Delta B_x - 2B_{iy}\Delta B_y + \Delta B_x^2 + \Delta B_y^2. \quad (10)$$

With this approximation, equations (3)–(5) become linear in $\Delta B_x$, $\Delta B_y$, and $s_{xy}$, resulting in the following three equations:

$$s_{xy}\sum_{i=1}^{N} B_{iy}^2(B_{ix} - \overline{B}_x) - \Delta B_y\sum_{i=1}^{N} B_{iy}(B_{ix} - \overline{B}_x) - \quad (11)$$

$$\Delta B_x\sum_{i=1}^{N} B_{ix}(B_{ix} - \overline{B}_x) = -\frac{1}{2}\sum_{i=1}^{N} (B_{ix}^2 + B_{iy}^2)(B_{ix} - \overline{B}_x),$$

$$s_{xy}\sum_{i=1}^{N} B_{iy}^2(B_{iy} - \overline{B}_y) - \Delta B_y\sum_{i=1}^{N} B_{iy}(B_{iy} - \overline{B}_y) - \quad (12)$$

$$\Delta B_x\sum_{i=1}^{N} B_{ix}(B_{iy} - \overline{B}_y) = -\frac{1}{2}\sum_{i=1}^{N} (B_{ix}^2 + B_{iy}^2)(B_{iy} - \overline{B}_y),$$

$$s_{xy}\sum_{i=1}^{N} B_{iy}^2\left(B_{iy}^2 - \overline{B}_y^2\right) - \Delta B_y\sum_{i=1}^{N} B_{iy}\left(B_{iy}^2 - \overline{B}_y^2\right) - \quad (13)$$

$$\Delta B_x\sum_{i=1}^{N} B_{ix}\left(B_{iy}^2 - \overline{B}_y^2\right) = -\frac{1}{2}\sum_{i=1}^{N} (B_{ix}^2 + B_{iy}^2)\left(B_{iy}^2 - \overline{B}_y^2\right),$$

where $\overline{B}_x$, $\overline{B}_y$, $\overline{B}_y^2$ are the averages over N tool face measurements, namely, $$\overline{B}_x = \frac{1}{N}\sum_{i=1}^{N} B_{ix},$$

$$\overline{B}_y = \frac{1}{N}\sum_{i=1}^{N} B_{iy},$$

$$\overline{B}_y^2 = \frac{1}{N}\sum_{i=1}^{N} B_{iy}^2.$$

Equations (11)–(13) can also be obtained by simply dropping quadratic and higher terms in $\Delta B_x$, $\Delta B_y$, and $s_{xy}$ from equations (3)–(5). They are solved easily using known algorithms for linear equation systems.

In cases where the linear approximation is unsatisfactory, iterations are required. The first step of the iteration is to solve equations (11)–(13) and apply the solutions to obtain corrected magnetic field measurements. Then the coefficients in equations (11)–(13) are computed using the corrected magnetic field and the equations are solved again with newly computed coefficients. This process repeats until the solutions become smaller than preset limits. Mathematically, the iterations are carried out using the following equations:

$$s_{xy}^{k+1}\sum_{i=1}^{N} B_{iy}^{k2}\left(B_{ix}^k - \overline{B}_x^k\right) - \Delta B_y^{k+1}\sum_{i=1}^{N} B_{iy}^k\left(B_{ix}^k - \overline{B}_x^k\right) - \Delta B_x^{k+1}\sum_{i=1}^{N} B_{ix}^k\left(B_{ix}^k - \overline{B}_x^k\right) =$$

$$-\frac{1}{2}\sum_{i=1}^{N} \left(B_{ix}^{k2} + B_{iy}^{k2}\right)\left(B_{ix}^k - \overline{B}_x^k\right),$$

$$s_{xy}^{k+1}\sum_{i=1}^{N} B_{iy}^{k2}\left(B_{iy}^k - \overline{B}_y^k\right) - \Delta B_y^{k+1}\sum_{i=1}^{N} B_{iy}^k\left(B_{iy}^k - \overline{B}_y^k\right) - \Delta B_x^{k+1}\sum_{i=1}^{N} B_{ix}^k\left(B_{iy}^k - \overline{B}_y^k\right) =$$

$$-\frac{1}{2}\sum_{i=1}^{N} \left(B_{ix}^{k2} + B_{iy}^{k2}\right)\left(B_{iy}^k - \overline{B}_y^k\right),$$

$$s_{xy}^{k+1}\sum_{i=1}^{N} B_{iy}^{k2}\left(B_{iy}^{k2} - \overline{B}_y^{k2}\right) - \Delta B_y^{k+1}\sum_{i=1}^{N} B_{iy}^k\left(B_{iy}^{k2} - \overline{B}_y^{k2}\right) -$$

$$\Delta B_x^{k+1}\sum_{i=1}^{N} B_{ix}^k\left(B_{iy}^{k2} - \overline{B}_y^{k2}\right) = -\frac{1}{2}\sum_{i=1}^{N} \left(B_{ix}^{k2} + B_{iy}^{k2}\right)\left(B_{iy}^{k2} - \overline{B}_y^{k2}\right),$$

$$B_{ix}^{k+1} = B_{ix}^k - \Delta B_x^k, \; i = 1, 2, 3, \ldots, N,$$

$$B_{iy}^{k+1} = (1 + s_{xy}^k)B_{iy}^k - \Delta B_y^k, \; k = 0, 1, 2, \ldots K,$$

$$B_{ix}^0 = B_{ix}, \; i = 1, 2, 3, \ldots, N,$$

$$B_{iy}^0 = B_{iy},$$

where superscript k in $x^k$ denotes x after k iterations.

After K iterations, $\Delta B_x$, $\Delta B_y$, and $s_{xy}$ are given by $$s_{xy} = (1 + s_{xy}^1)(1 + s_{xy}^2) \ldots (1 + s_{xy}^{k+1}) - 1,$$

$$\Delta B_x = \sum_{k=1}^{K} \Delta B_x^k,$$

$$\Delta B_y = (1 + s_{xy})B_{iy} - B_{iy}^{K+1}, \; 1 \leq i \leq N.$$

The iteration stops at k=K when $\Delta B_x^K$, $\Delta B_y^K$, and $s_{xy}^K$ become smaller than the preset accuracy requirements. The linear approximation used to obtain equations (11)–(13) is very good. Rarely more than one iteration is needed. The iteration method is a multivariate version of the Newton-Raphson method (multivariate Newton-Raphson method).

Equations (8) and (9) are also solved for s and $\Delta B_z$ using the multivariate Newton-Raphson method. Because s and $\Delta B_z$ are very small compared with 1 and the magnitude of magnetic field, respectively, the multivariate Newton-Raphson method is very effective. In most cases, only one iteration is required. Namely, the solution to the following linear equations is an excellent approximation of that of equations (8) and (9):

$$s\frac{1}{N}\sum_{i=1}^{N} \left(\tilde{B}_{ix}^2 + \tilde{B}_{iy}^2\right) - \Delta B_z\overline{B}_z = \frac{1}{2}\left[B_{ref}^2 - \frac{1}{N}\sum_{i=1}^{N} \left(\tilde{B}_{ix}^2 + \tilde{B}_{iy}^2 + \tilde{B}_z^2\right)\right], \quad (14)$$

$$s\frac{1}{N}\sum_{i=1}^{N} \left[\frac{\overline{B}_z^2(G_{ix}\tilde{B}_{ix} + G_{iy}\tilde{B}_{iy}) - G_{iz}\overline{B}_z\tilde{B}_{ioxy}^2}{G_i\tilde{B}_i^3}\right] - \quad (15)$$

$$\Delta B_z\frac{1}{N}\sum_{i=1}^{N} \left[\frac{G_{iz}}{G_i\tilde{B}_i} - \frac{(\vec{G}_i \cdot \vec{B}_i)\overline{B}_z}{G_i\tilde{B}_i^3}\right] = \sin(\theta_{ref}) - \frac{1}{N}\sum_{i=1}^{N} \frac{\vec{G}_i \cdot \vec{B}_i}{G_i\tilde{B}_i},$$

where $$\tilde{B}_i = \sqrt{\tilde{B}_{ix}^2 + \tilde{B}_{iy}^2 + \overline{B}_z^2},$$

$$\tilde{B}_{ioxy}^2 = \tilde{B}_{ix}^2 + \tilde{B}_{iy}^2,$$

$$G_i = \sqrt{G_{ix}^2 + G_{iy}^2 + G_{iz}^2},$$

$$\vec{G}_i \cdot \vec{B}_i = G_{ix}\tilde{B}_{ix} + G_{iy}\tilde{B}_{iy} + G_{iz}\overline{B}_z.$$

Figure 3:
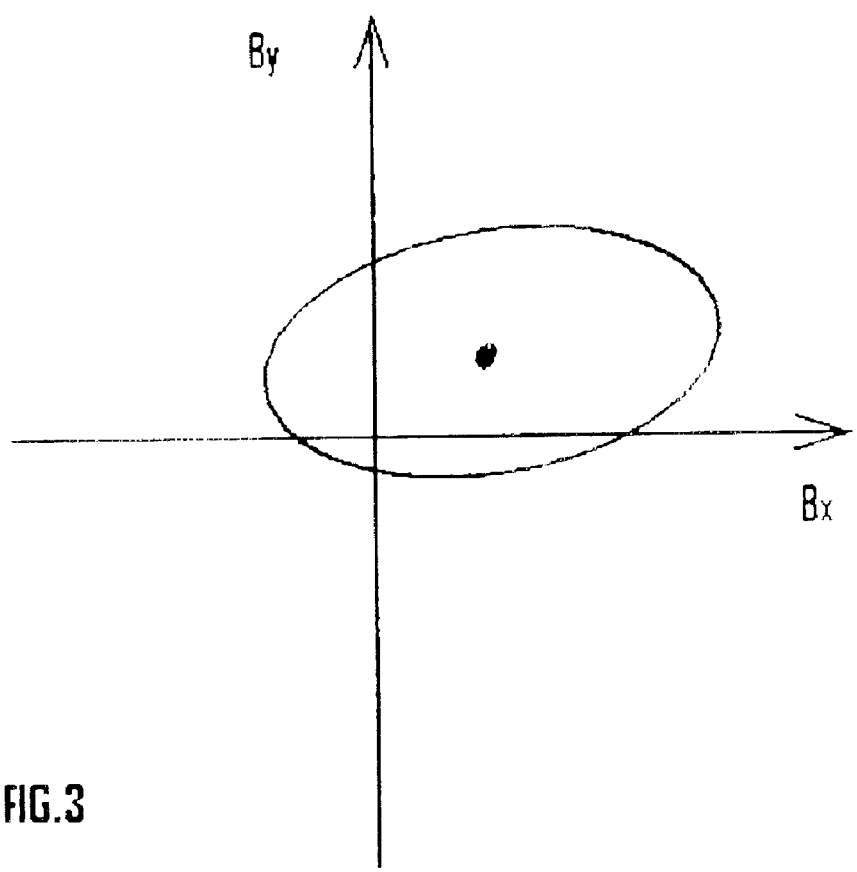
FIG. 3 is a diagram similar to that of FIG. 1 except that the cross-axial magnetometers have bias, scale-factor, and misalignment errors.

FIG. 3 is a plot of the cross-axial magnetic field measured by a pair of x and y magnetometers that are not orthogonal to each other. The misalignment error causes the magnitude of the cross-axial magnetic field to vary with tool face. Therefore, the misalignment error can also be determined by the constant magnitude constraint. In cases where the errors in misalignment between x and y magnetometers are not negligible, equation (2) is replaced by the following:

$$\begin{pmatrix} \tilde{B}_{ix} \\ \tilde{B}_{iy} \end{pmatrix} = \begin{bmatrix} 1 & m \\ m & 1 \end{bmatrix} \begin{pmatrix} B_{ix} \\ (1+s_{xy})B_{iy} \end{pmatrix} - \begin{pmatrix} \Delta B_x \\ \Delta B_y \end{pmatrix}, i = 1, 2, 3 \ldots, N, \quad (16)$$

where m is the misalignment error parameter.

Substitute equation (16) into equation (6) and then set the first derivatives of 1 with respect to $\Delta B_x$, $\Delta B_y$, $s_{xy}$, and m to zero, respectively. The resulting four equations are solved by the multivariate Newton-Raphson method. Then s and $\Delta B_z$ are obtained by solving equations (8) and (9) in the same way as described previously.

The solutions are applied to correct magnetic readings at the survey point by $$\begin{pmatrix} B_{ixc} \\ B_{iyc} \\ B_{izc} \end{pmatrix} = \begin{bmatrix} 1+s & m(1+s) & 0 \\ m(1+s) & (1+s)(1+s_{xy}) & 0 \\ 0 & 0 & 1 \end{bmatrix} \begin{pmatrix} B_{ix} \\ B_{iy} \\ \bar{B}_z \end{pmatrix} - \begin{pmatrix} (1+s)\Delta B_x \\ (1+s)\Delta B_y \\ \Delta B_z \end{pmatrix}, i = 1, 2, 3, \ldots, N. \quad (17)$$

The corrected magnetic measurements of the cross-axial magnetic field are free of errors in bias, scale-factor, misalignment in x and y magnetometers. The corrected axial magnetic measurement is free of errors. The cross-axial magnetic measurements at other survey points in the well can be corrected by $$\begin{pmatrix} B_{xc} \\ B_{yc} \end{pmatrix} = (1+s) \begin{bmatrix} 1 & m & 0 \\ m & 1+s_{xy} & 0 \end{bmatrix} \begin{pmatrix} B_x \\ B_y \end{pmatrix} - (1+s) \begin{pmatrix} \Delta B_x \\ \Delta B_y \end{pmatrix}. \quad (18)$$

The $\Delta B_z$ represents the axial magnetic measurement error at the survey point. In cases where bias error is the dominant source of error, i.e., when magnetic interference is significant, $\Delta B_z$ is the bias error in the axial magnetometer. Then, axial magnetic measurements at other survey points can be corrected by $$B_{zc} = B_z - \Delta B_z. \quad (19)$$

When scale-factor error is known to be the main source of error in the axial magnetometer, the error is $s_z = (\bar{B}_z - \Delta B_z)/\bar{B}_z - 1$. This scale error can be correct at other survey points by $$B_{zc} = (1+s_z)B_z. \quad (20)$$

Well orientations obtained by using the magnetometer measurements corrected by methods of this invention are free of errors in bias, scale-factor, and misalignment in x and y magnetometers and are free of errors in z magnetometers. In interference correction applications this invention greatly reduce the size of the region near the East-West and horizontal orientation where the corrections are ineffective and erroneous.

Either of the two steps can be used without the other to improve magnetometer measurements. In a case where the first step is not necessary or unrealizable, only s and $B_{zc}$ (hence $\Delta B_z$) are determined. Equations (8) and (9) are modified by replacing the cross-axial magnetic measurements corrected by the constant magnitude constraint by the uncorrected ones. s and $B_{zc}$ can be obtained with measurements at only one tool face. Therefore, the second step alone can be applied to any survey to improve the accuracy of well orientation determination.

Applying the second step alone to correct the axial magnetic interference is still advantageous over prior art methods where both reference values of the magnitude and dip angle of the earth's magnetic field are used to obtain the axial magnetic measurement only. The scale-factor error in x and y magnetometers is not corrected and can cause azimuth error as mentioned previously. In this invention, the two reference values are used to determine two unknowns. In addition to the axial magnetic measurement, the scale-factor error common to x and y magnetometers is also corrected. The axial magnetic measurement determined using method of this invention is less prone to cross-axial magnetic measurement error than that of prior art method.

Figure 4:
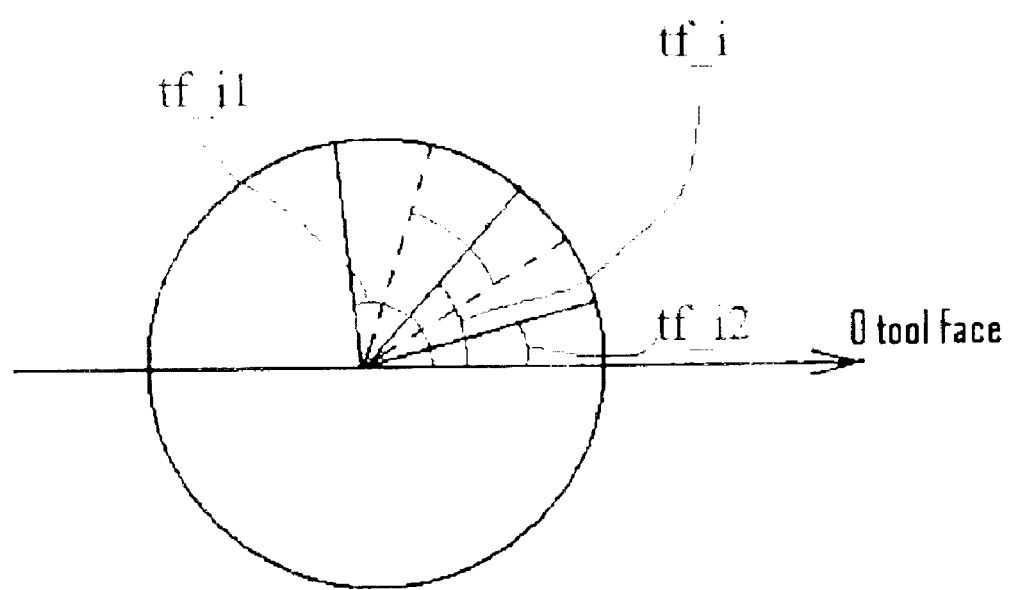
FIG. 4 is a diagram of relationships among a tool face angle and its nearest neighbors where directional sensor measurements are made.

Measurement at each tool face is given an equal weight of 1/N in computing I in equation (6). The equal weighting is based on the assumption that the directional measurements are made at the tool face angles approximately evenly distributed in the entire range of tool face. If the tool face angles are not evenly distributed, uneven weights are used. The weight for measurement at the ith tool face angle is $$W_i = \frac{0.5 \text{ mod}(tf\_i1 - tf\_i2 + 360, 360)}{360}, \quad (21)$$

where tf_i1 and tf_i2 are the nearest tool face angles in degrees from the ith tool face counter-clockwise and clockwise, respectively, and mod(a, b) is the remainder of a/b. The angles are shown in FIG. 4. The numerator in the above expression is the angle between the two dashed lines in the figure.

Accelerometer measurement errors can also be corrected using the method of this invention in two steps in a similar way as described above for magnetometer measurements. In the first step, the gravitational measurements at multiple tool face angles at a survey point are used to determine errors in biases, a relative scale-factor, and a misalignment in x and y accelerometers by the centered circular requirements (constant magnitude constraint) for cross-axial gravitational measurements. Then the reference magnitude of earth's gravity (G total constraint) and the magnetic dip angle are used to determine the correct axial gravitational measurement and the common scale-factor error in the cross-axial accelerometers.

The magnetic dip is a joint property between the earth's gravitational and magnetic fields. Once the constraint is satisfied by correcting either magnetic or gravitational measurements it is no longer a constraint for the other measurements. Thus the dip angle constraint can not be applied simultaneously to correct both gravitational and magnetic measurements as described above. When both types of sensors are calibrated and corrected using the method of this invention, the second step for either magnetic or gravitational measurements must be modified. For example, in operations with shortened nonmagnetic collars, the dip angle constraint is used for magnetic calibration and correction. The second step for accelerometer measurements is changed to using the G total constraint to determine either the axial gravitational field or the common cross-axial scale-factor error.

The foregoing disclosure and description of the invention is illustrative and explanatory thereof. Various changes in the details of the method may be made within the spirit and scope of the claims of this invention. The present invention should only be limited by the claims below and their equivalents.

What is claimed is:

1. A method of calibrating a directional sensor array, including a plurality of field sensors, located within a drillstring within a wellbore, comprising the steps of:

measuring at least on field with said sensor array at at least four tool face orientations at a survey point in said wellbore; and utilizing said field measurements to recalibrate a relative scale-factor between cross-axial sensors in said sensor array, wherein said field sensors comprise accelerometers.

2. The method of claim 1 wherein said field comprises a gravitational field.

3. The method of claim 1 wherein said field sensors comprise magnetometers and accelerometers.

4. The method of claim 3 wherein said field comprises a magnetic field and a gravitational field.

5. A method of calibrating a magnetometer sensor array located within a drillstring within a wellbore, comprising the steps of:

measuring a magnetic field with said sensor array at at least four tool face orientations at a survey point in said wellbore; and utilizing said magnetic field measurements and a measure of gravitational field to recalibrate a relative scale-factor between cross-axial magnetometers in said sensor array.

6. The method of claim 5 further comprising utilizing said field measurements to recalibrate biases in the cross-axial magnetometers.

7. The method of claim 5 further comprising utilizing said field measurements to recalibrate a misalignment between the cross-axial magnetometers.

8. The method of claim 5 further comprising utilizing said field measurements to recalibrate biases in the cross-axial magnetometers and a misalignment between the cross-axial magnetometers.

9. A method of calibrating a magnetometer sensor array located within a drillstring within a wellbore, comprising the steps of:

measuring a magnetic field with said sensor array at at least four tool face orientations at a survey point in said wellbore;

utilizing said field measurements to recalibrate a relative scale-factor between cross-axial magnetometers in said sensor array;

utilizing said field measurements to recalibrate biases in the cross-axial magnetometers and a misalignment between the cross-axial magnetometers; and combining the corrections of cross-axial magnetic field measurements using said recalibrated relative scale factor and said recalibrated biases and said recalibrated misalignment to determine an axial magnetic field component.

10. A method of calibrating an accelerometer sensor array located within a drillstring within a wellbore, comprising the steps of:

measuring a gravitational field with said sensor array at at least four tool face orientations at a survey point in said wellbore; and utilizing said gravitational field measurements to recalibrate a relative scale-factor between cross-axial accelerometers in said sensor array.

11. The method of claim 10 further comprising utilizing said field measurements to recalibrate biases in the cross-axial accelerometers.

12. The method of claim 10 further comprising utilizing said field measurements to recalibrate a misalignment between the cross-axial accelerometers.

13. The method of claim 10 further comprising utilizing said field measurements to recalibrate biases in the cross-axial accelerometers and a misalignment between the cross-axial accelerometers.

14. The method of claim 13 further comprising combining the corrections of cross-axial gravitational field measurements using said recalibrated relative scale factor and said recalibrated biases and said recalibrated misalignment to determine an axial gravitational field component.

15. A method of surveying a wellbore utilizing a sensor array located within a drillstring within said wellbore, said method comprising:

obtaining a reference value for a magnitude of earth's magnetic field and a reference value for a magnetic dip angle of the earth's magnetic field;

measuring magnetic and gravitational fields with said sensor array at a plurality of tool face orientations at a survey point in the wellbore;

utilizing said measurements of the magnetic and gravitational fields and said reference values of the magnitude and magnetic dip angle of the earth's magnetic field to obtain a measurement of an axial component of the earth's magnetic field, to recalibrate a common scale factor parameter in cross-axial magnetometers in said array;

applying the one or more calibration parameters to the magnetic measurements at said survey point to obtain corrected magnetic field measurements; and utilizing said gravitational field measurements and said corrected magnetic field measurements to obtain at least one wellbore orientation parameter at said survey point.

16. The method of claim 15 further comprising utilizing said measurements of the magnetic field to recalibrate biases in the cross-axial magnetometers.

17. The method of claim 15 further comprising utilizing said measurements of the magnetic field to recalibrate a misalignment in the cross-axial magnetometers.

18. The method of claim 15 further comprising utilizing said measurements of the magnetic field to recalibrate a relative scale factor in the cross-axial magnetometers.

19. The method of claim 15 further comprising utilizing said measurements of the magnetic field to recalibrate biases and relative scale factor and misalignment in the cross-axial magnetometers.

20. A method of calibrating a directional sensor array located within a drillstring within a wellbore, comprising:

obtaining a reference value for the magnitude of the earth's magnetic field and a reference value for the magnetic dip angle of the earth's magnetic field;

measuring said magnetic and gravitational fields with said sensor array at four or more tool face orientations at a survey point in the wellbore;

utilizing said measurements of the magnetic and gravitational fields and said reference values of the magnitude and magnetic dip of the earth's magnetic field to obtain a measurement of axial component of the earth's magnetic field, and to recalibrate cross-axial magnetometers in said array to a calibration parameter comprising a common scale-factor parameter, and to recalibrate an axial magnetometer in said array to either a bias calibration parameter or a scale factor calibration parameter; and applying the one or more calibration parameters to the magnetic measurements at one or more survey points to obtain the corrected magnetic field measurements.

21. The method of claim 20 further comprising utilizing said measurements from the magnetic field to recalibrate at least one additional calibration parameter from a group comprising biases of the cross-axial magnetometers and a relative scale factor and a misalignment between the cross-axial magnetometers.

22. A method of calibrating a directional sensor array located within a drillstring within a drill string within a wellbore, the method comprising:
  measuring a magnetic field with said sensor array at four or more tool face orientations at a first survey point in the wellbore;
  utilizing said measurements of the magnetic field
    to recalibrate cross-axial magnetometers in said array to a calibration parameter comprising a relative scale-factor and to at least one additional calibration parameter comprising biases of said cross-axial magnetometers and misalignment between said cross-axial magnetometers and
  applying said one or more calibration parameters to the magnetic measurements made at said first survey point or to measurements made at additional survey points to obtain corrected magnetic field measurements.

23. A method of calibrating a directional sensor array located within a drillstring within a drillstring within a wellbore, the method comprising:
  obtaining a reference value for magnitude of earth's magnetic field and a reference value for the magnetic dip angle of the earth's magnetic field for the site of said wellbore;
  measuring magnetic and gravitational fields with said sensor array at one or more tool face orientations at a survey point within the wellbore;
  utilizing said measurements of the magnetic and gravitational fields and said reference values to recalibrate a scale factor calibration parameter in cross-axial magnetometers;
  and to recalibrate either a bias or scale factor calibration parameters in a axial magnetometer within said array; and
  applying the calibration parameters to the magnetic measurements made at said survey point or made at other survey points to obtain the corrected magnetic field measurements.

24. A method of surveying a wellbore utilizing a sensor array located within a drillstring within said wellbore, the method comprising:
  obtaining a reference value for the magnitude of earth's gravitational field and a reference value for the magnetic dip angle of earth's magnetic field;
  measuring the magnetic and gravitational fields with said sensor array at four or more tool face orientations at a survey point in the wellbore;
  utilizing said measurements of the magnetic and gravitational fields and said reference values of the magnitude of the earth's gravitational field and the magnetic dip of the earth's magnetic field
    to obtain a measurement of the axial component of the earth's gravitational field, and
    to recalibrate a common scale factor calibration parameter in cross-axial accelerometers in said array, and to
    to obtain at least one calibration parameter from a group of calibration parameters comprising
      a relative scale-factor in the cross-axial accelerometers,
      a misalignment between the cross-axial accelerometers, and
      biased in the cross-axial accelerometers;
  applying the one or more calibration parameters to the gravitational measurements at said survey point to obtain corrected gravitational field measurements; and
  utilizing said corrected gravitational field measurements to obtain at least one well orientation parameter at said survey point.

25. A method of calibrating a directional sensor array located within a drillstring within a wellbore, the method comprising:
  obtaining a reference value for the magnitude of earth's gravitational field and a reference value for magnetic dip angle of earth's magnetic field for the site of said wellbore;
  measuring the magnetic and gravitational fields with said sensor array at four or more tool face orientations at a survey point in the wellbore;
  utilizing said measurements of the magnetic and gravitational fields and said reference values of the magnitude of the earth's gravitational field and the magnetic dip of the earth's magnetic field
    to obtain a measurement of an axial component of the earth's gravitational field,
    to recalibrate cross-axial gravitational in said array to a calibration parameter comprising a common scale-factor parameter and to at least one additional calibration parameter from a group comprising biases of said cross-axial gravitational and a misalignment and a relative scale factor between said cross-axial gravitational, and
    to recalibrate an axial gravitational in said array to either a bias calibration parameter or a scale factor calibration parameter; and
  applying the one or more calibration parameters to the gravitational measurements made at said survey point or made at other survey points within said wellbore to obtain the corrected gravitational field measurements.

26. A method of calibrating a directional sensor array located within a drillstring within a wellbore, the method comprising:
  measuring gravitational field with said sensor array at four or more tool face orientations at a first survey point in the wellbore;
  utilizing said measurements of the gravitational field in combination a with measurement of magnetic field to recalibrate a relative scale-factor calibration parameter between cross-axial accelerometers within said array and at least one additional calibration parameter from a group comprising the biases in the cross-axial accelerometers and the misalignment between the cross-axial accelerometers; and
  applying the one or more calibration parameters to the gravitational measurements made at said first survey point or at additional survey points to obtain the corrected gravitational field measurements.

27. A method of calibrating a directional sensor array located within a drillstring within a wellbore, the method comprising:
  obtaining a reference value for the magnitude of earth's gravitational field and a reference value for magnetic dip angle of the earth's magnetic field;
  measuring magnetic and gravitational fields with said sensor array at one or more tool face orientations at a first survey point in the wellbore;
  utilizing said measurements of the magnetic and gravitational fields and said reference values of the magnitude of the earth's gravitational field and the magnetic dip of the earth's magnetic field to recalibrate a scale factor calibration parameter in cross-axial accelerometers within said array;

utilizing said measurements of the magnetic and gravitational fields and said reference values of the magnitude of the earth's gravitational field and the magnetic dip of the earth's magnetic field to determine either a bias calibration parameter or scale factor in an axial accelerometer of said array; and applying the calibration parameters to the gravitational measurements at said first survey point or at other survey points to obtain the corrected gravitational field measurements.

28. A method of surveying a wellbore utilizing a sensor array located within a drillstring within said wellbore, the method comprising:

obtaining a reference value for the magnitude of earth's magnetic field, a reference value for magnetic dip angle of the earth's magnetic field, and a reference value of magnitude of the earth's gravitational field;

measuring the magnetic and gravitational fields with said sensor array at four or more tool face orientations at a survey point in the wellbore;

utilizing said measurements of the gravitational fields and said reference value of the magnitude of the earth's gravitational field to obtain at least one recalibrate parameter selected from a group parameters comprising
  the biases and scale-factors in cross-axial accelerometers within said array,
  a misalignment between the cross-axial accelerometers, and
  either a bias or scale factor in an axial accelerometer within said array;

applying the at least one recalibrate parameter to the gravitational measurements at said first survey point to obtain corrected gravitational field measurements;

utilizing said measurements of the magnetic field and the corrected gravitational field and said reference values of the magnitude and magnetic dip of the earth's magnetic field to obtain a measurement of axial component of the earth's magnetic field and to recalibrate a common scale-factor parameter in cross-axial magnetometers within said array and to obtain at least one parameter from a group of parameters comprising
  the biases and a relative scale-factor in the cross-axial magnetometers,
  a misalignment between the cross-axial magnetometers, applying said one or more recalibrate parameters to the magnetic measurements at said survey point to obtain corrected magnetic field measurements; and combining said corrected gravitational field measurements and said corrected magnetic field measurements to obtain at least one well orientation parameter at said survey point.

29. A method of surveying a wellbore utilizing a sensor array located within a drillstring within said wellbore, the method comprising:

obtaining a reference value for magnitude of the earth's magnetic field, a reference value for magnetic dip angle of the earth's magnetic field, and a reference value of magnitude of the earth's gravitational field;

measuring the magnetic and gravitational fields with said sensor array at four or more tool face orientations at a survey point in the wellbore;

utilizing said measurements of the magnetic fields and said reference value of the magnitude of the earth's magnetic field to recalibrate at least one parameter selected from a group of parameters comprising
  biases and scale-factors in cross-axial magnetometers within said array,
  a misalignment between the cross-axial magnetometers, and
  either a bias or scale factor in an axial magnetometer;

applying said one or more parameters to the magnetic measurements at said survey point to obtain corrected magnetic field measurements;

utilizing said measurements of the gravitational field and the corrected magnetic field and said reference values of the magnitude of the earth's gravitational field and the magnetic dip of the earth's magnetic field to obtain a measurement of axial component of the earth's gravitational field and to recalibrate a common scale-factor in cross-axial accelerometers within said array and to recalibrate at least one parameter selected from a group of parameters comprising
  the biases and a relative scale-factor the cross-axial accelerometers within said array,
  a misalignment between the cross-axial accelerometers;

applying the one or more recalibrate parameters to the gravitational measurements at said survey point to obtain corrected gravitational field measurements; and utilizing said corrected gravitational field measurements and said corrected magnetic field measurements to obtain at least one well orientation measurement at said survey point.

* * * * *